Patented July 21, 1925.

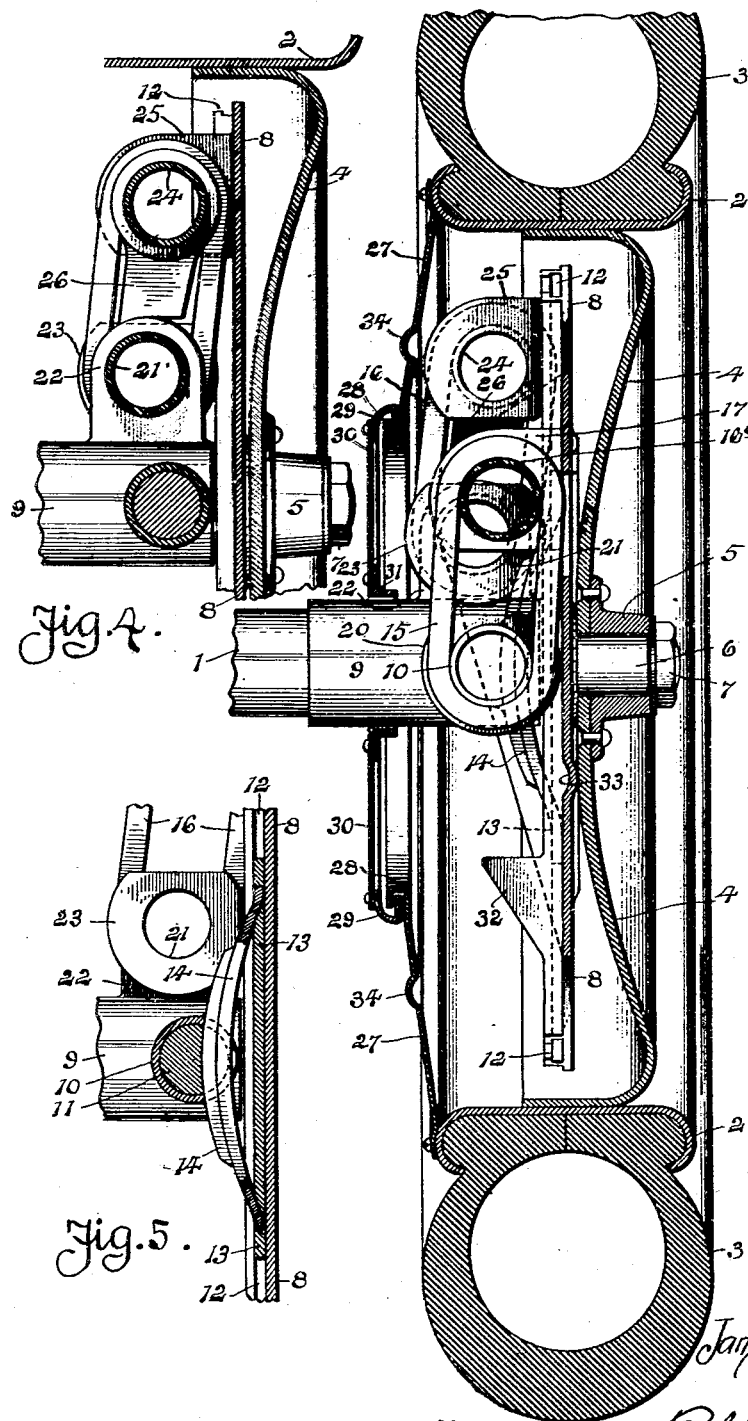

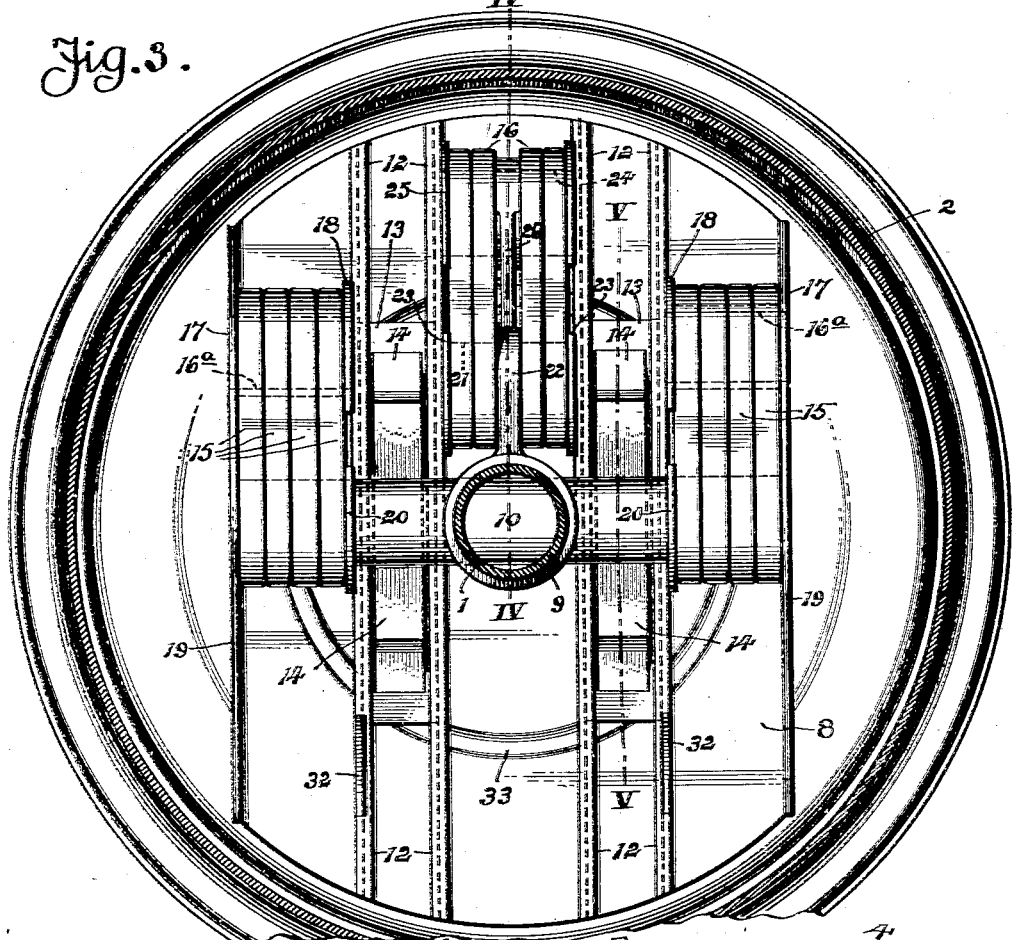
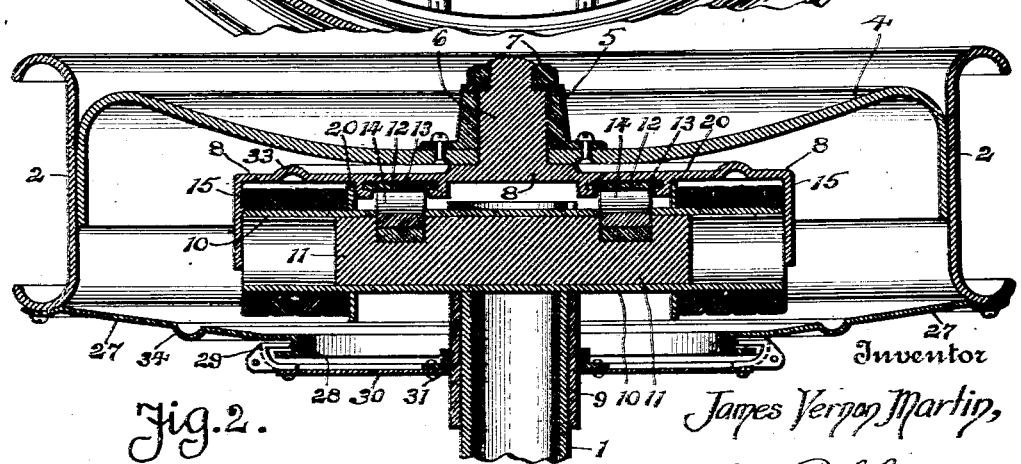

1,546,500

UNITED STATES PATENT OFFICE.

JAMES VERNON MARTIN, OF DAYTON, OHIO.

VEHICLE WHEEL.

Application filed March 13, 1920. Serial No. 365,381.

*To all whom it may concern:*

Be it known that I, JAMES VERNON MARTIN, a citizen of the United States of America, residing at Dayton, in the county of Montgomery and State of Ohio, have invented certain new and useful Improvements in Vehicle Wheels, of which the following is a specification, reference being had therein to the accompanying drawings.

This invention relates to running and alighting devices for air craft and more particularly to an arrangement of spring suspension and ground wheel construction thereof. The object of the invention is primarily to provide an improved ground wheel which will absorb and diffuse the shocks incident to landing or running over rough ground, and which is of minimum weight for strength required and of simple, durable and compact construction.

A further object of the invention is to provide a construction wherein a limited lateral yielding movement is provided in the wheel to absorb lateral shocks, strains, and stresses, and which is such as to lend itself to the employment of a disk wheel of the usual construction.

It is also an object of the invention to provide an arrangement of spring suspension for the load carrying axle whereby head resistance is reduced to a minimum and the spring tension or resistance to relative movement between axle and wheel may be varied expeditiously according to load requirements.

It is further an object of the invention to provide a construction wherein the wheel proper is mounted to turn freely upon an axle stub in the usual manner of mounting disk wheels and means for supporting the non-rotatable axle to permit a relative vertical movement between axle and wheel, is located within the plane of the wheel rim, whereby the wheel disk and a suitable closure for the other side of the wheel form an enclosing chamber within the wheel for all of the mechanism.

It is also an object of the invention to provide certain other new and useful features in the construction and arrangement of parts, all as hereinafter more fully described.

With the above and other ends in view, the invention consists in the matters hereinafter set forth and claimed, reference being had to the accompanying drawings in which Figure 1 is a transverse vertical section through a wheel structure illustrative of the invention;

Fig. 2 is a horizontal section through the same;

Fig. 3 is an elevation of the same with the rim of the wheel in section and the closure for the inner side of the wheel removed;

Fig. 4 is a sectional detail substantially upon the line IV—IV of Fig. 3 and

Fig. 5 is a sectional detail substantially upon the line V—V of Fig. 3.

As shown in the drawings 1 indicates a fixed or nonrotatable axle of any desired form or construction and the ground wheel supporting this axle comprises the usual rim 2 having the tire 3 applied thereto, the rim being carried by a sheet metal disk 4 to the periphery of which disk the rim 2 is made fast in the usual manner.

In the usual manner of constructing disk wheels, the disk 4 is dished or formed concave at the outer side of the wheel with the inner convex side of the disk facing toward the inner or axle side of the wheel and at its axis, this disk is provided with the usual hub 5 to receive a stub axle 6 and upon which stub the wheel rotates freely and is held thereon in any suitable manner as by a nut 7. The stub axle 6 is carried by and formed with a plate 8, the stub extending laterally from the plate with the plate positioned transversely of the stub 6 and axle 1 and extending substantially in the central vertical plane of the wheel rim 2.

The end of the axle 1 confronts the inner face of the plate 8 and is connected to and supported by this plate in a manner hereinafter described.

The end of the axle 1 which is preferably of tubular form for the purpose of strength and lightness, is provided with a sleeve 9 which is slipped over the end of the axle and brazed or otherwise secured thereon.

Secured within a transverse opening in the sleeve 9 at the extreme end thereof is a tube 10 extending transversely of the axle 1 at right angles thereto, which tube is strengthened by a plug 11 fitting in the tube and filling the central portion thereof, said tube 10 and plug 11, together with the sleeve 9, forming a T-head upon the end of the axle. The plate 8 is formed in any suitable manner with vertical parallel guide ways 12 upon the inner surface of the plate, which guide ways are adapted to receive and guide suitable slides 13 to which the ends of leaf-springs 14 are secured by inserting the ends of the main leaf of each spring in notches in the slides 13 and brazing or otherwise securing these ends in the notches. Intermediate its end each leaf spring 14 is secured to the T-head of the axle by providing notches in the outer side of the tube 10 and filler 11 to receive these springs and then brazing or otherwise firmly securing the springs within these notches or seats in the T-head.

The end of the axle is thus connected to the plate 8 yieldingly by means of the springs 14 and to have a vertical sliding movement relative to said plate and wheel by the connection of the springs 14 to the slides 13 which are free to slide within the vertical parallel guide ways 12 provided upon the inner face of the plate, which plate is in turn prevented from rotation by such connection with the T-head of the non-rotatable axle and is supported by the wheel which is free to rotate upon the stub shaft or axle 6 formed integral with the plate.

To yieldingly support the axle and its load and normally hold said axle in longitudinal axial alignment with the stub axle 6, suitable spring suspension mechanism is provided for connecting the T-head of the axle with the plate which mechanism comprises preferably three sets of rubber bands, there being 2 like sets of such bands 15 at each side of the vertical plane of the axle, and a third set 16 within the vertical plane of the axle and above the same. Any desired number of bands may be employed in each set, there being preferably four bands in each set 15 and each band being in the form of a continuous loop by connecting the ends of each band in any suitable manner. The continuous bands of each set 15 are engaged over the extreme outer ends of the tube 10 of the T-head of the axle 1 and at their upper or opposite ends, these loops are engaged over suitable spools or tubular members 16ª mounted in brackets 17 formed integral with the plate 8, said spools having end flanges 18 to prevent the bands from slipping endwise from these spools in one direction and the brackets 17 performing a like function at the other ends of the spools.

The side edges of the plate 8 may be turned laterally to form the brackets 17 and to also form guide flanges 19 extending laterally from the plate adjacent the ends of the tube 10 to assist in guiding the T-head in its vertical movements relative to the plate 8 and also to prevent the bands 15 from slipping endwise off the ends of said tube. To prevent the bands 15 from slipping longitudinally of the tube 10 inwardly toward the axle, said tube may be provided with suitable flanges or collars 20.

The third set 16 of bands preferably comprises two pairs of bands engaged over a spool 21 mounted intermediate its ends in a lug 22 formed integral with the sleeve 9 and extending upwardly therefrom. This lug 22 embraces the spool or tubular member 21 between the pairs of bands and the spool is provided with a flange 23 at each end to prevent the bands from slipping longitudinally of the spool off the ends thereof. The upper ends of the loops 16 embrace a spool or tubular member 24 mounted at its ends in brackets 25 formed integral with the plate 8, said brackets forming flanges at the ends of the spool to prevent the bands from slipping therefrom.

Mounted upon the spool or tubular member 24 to turn thereon, and between the pairs of elastic bands 16, is a stop arm 26 adapted to engage at its free end the upper end of the lug 22 forming the bearing on the axle for the spool 21. This stop arm 26 performs the function of spacing the spool 24 from the spool 21 and thus limiting the upward movement of the axle 1 relative to the plate 8. By turning the stop arm 26 out of engagement with the lug 22, the axle 1 may be lifted or elevated relative to the plate 8, thus taking the weight thereof from all of the bands 15 and 16 so that they will not be under tension and may be readily removed from their spools for the purpose of replacement or repair or for the purpose of varying the numbers of these bands according to the load to be carried by the axle.

The slides 13 being free to move vertically in their guide ways on the plate 8, permit of a free vertical movement of the axle 1 relative to the plate 8 which is rigidly carried by the stub 6 and supported by the wheel which is free to rotate upon the stub. This relative vertical movement between axle and plate is resisted by the several sets of elastic bands, the number of which may be varied according to the load requirements and as these bands connect the plate 8 and T-head of the axle close to the inner face of the plate, they are positioned substantially between the vertical planes of the side edges of the rim 2 and are therefore carried substantially within the wheel itself so that the suspension mechanism offers no head resistance.

By yieldingly connecting the T-head of the axle with the two slides 13 by means of the springs 14, the wheel is yieldingly held at right angles to the axis of the axle 1, to normally rotate in a vertical plane at right angles to the axis of the axle but in alighting, and travelling over rough ground, severe lateral shocks and strains to which the wheel may be subjected, is taken up by this yielding connection or springs 14, said springs yielding just sufficiently to momentarily relieve the lateral strain on the wheel but being of such rigidity as to immediately recover and bring the wheel back to its normal plane of rotation.

In this construction the strongest form of wheel known is employed, to wit, a disk wheel, and as the disk 4 forming the web of the wheel is dished slightly as in common practice, the wheel itself has lateral flexibility and great strength due to the dishing of the disk which gives it great power of recovery from lateral flexure. The wheel itself therefore tends to relieve the mechanism of severe shock and strain to which it is subjected in landing or running over rough ground when the load comes upon the wheel in other than a vertical direction. This disk form of wheel is also particularly adapted for air craft structures and other uses to which the construction shown may be put, in that the disk which forms the web of the wheel also forms a closure for one side of a chamber within the wheel in which the suspension mechanism and means for connecting the axle to the wheel, are located.

As shown in the drawing, the other or inner side of this chamber within the wheel may be closed by means of a sheet metal annular closure 27 which is secured at its periphery to the inner edge of the rim 2 of the wheel in any suitable manner and is provided at its inner peripheral edge with the channel 28 to receive loosely the inturned edge of a ring 29 to which ring is secured the outer edge of a diaphragm 30, the inner edge of this diaphragm being secured to a ring 31 sleeved loosely upon the sleeve 9 of the axle 1. The diameter of the central opening in the annular closure 27 is such as to permit the axle 1 to move therein throughout the limits of its vertical movement relative to the plate 8, the diaphragm 30 which is of rubber or other suitable material, yielding to permit of such movement Because of the loose engagement of the ring 28 with the channel of the annular closure 27, and also because the ring 31 is sleeved loosely upon the axle, the annular closure 27 is always free to turn with the wheel without putting undue torsional strain upon the diaphragm 30.

As previously described, the upward movement of the axle 1 relative to the plate 8 is limited by means of the stop member 26 and said axle is normally held, when not under extreme load, in longitudinal axial alignment with the turning axis of the wheel, and the downward movement of said axle is limited by means of stops 32 formed integral with the plate 8 to engage the transverse arm or sleeve 10 of the T-head of the axle.

For the purpose of strengthening the plate 8, said plate may be formed with an annular rib 33 in a like manner and for the same purpose the annular closure 27 may be formed with an annular rib 34.

A very strong and flexible ground wheel which is particularly adapted for air craft is provided in the present construction in that a disk wheel is employed and further by the employment of a wheel of this type the construction is greatly simplified and the wheel may be quickly and easily taken off in the same manner in which such a wheel may be dismounted from the axle of a motor vehicle. Further, in this construction, the wheel proper turns upon its own hub entirely independent of the spring suspension and means for providing a connection between axle and wheel and relative movement between these parts.

The disk wheel employed in this construction is of a type in common use and may be manufactured by manufacturers of this type of wheel without material change in design or method of production.

In the present construction, the suspension mechanism and mechanism for connecting the axle and wheel become a unitary structure which may be assembled as a whole and then the wheel forming a separate unitary structure may be applied thereto. Further, the spring suspension and other mechanism provides a very compact arrangement which is located wholly within the wheel where it is enclosed against the accumulation of dirt and dust thereon and where it will offer no head resistance to flight when this construction is applied to air craft.

Obviously changes may be made in the details of construction and arrangement of parts within the scope of the appended claims without departing from the spirit of the invention and I do not therefore limit myself to the form or arrangement shown.

Having thus fully described my invention, what I claim is:

1. In combination with a resilient wheel, an outwardly dished cover plate having two parts capable of independent rotation relative to each other, and one of said parts flanged adjacent its engagement with the other part, the inner of said parts having an opening to receive the wheel axle.

2. In combination with a vehicle wheel, two non-rotatable parts of said wheel, elastic bands resisting the separation of the said parts and a cover plate including an inner and outer portion capable of independent motion relative to each other and the inner of said portions arranged to cover the said non-rotatable parts.

3. In combination with a wheel for vehicles, a shock-absorber including elastic bands and a cover plate in two separate parts, one of said parts adapted to cover the said elastic bands and the other part attached to the wheel rim to revolve therewith.

4. In combination with a wheel provided with an internally contained shock absorber, a disc attached to the rim of the said wheel and rotating therewith, said disc being outwardly bulged from the said rim attachment, and having a hole in its center, the said hole being closed by an additional disc and the said first disc indentured for the reception of the last said disc.

In testimony whereof I affix my signature in the presence of two witnesses.

JAMES VERNON MARTIN.

Witnesses:
  W. D. ANSPACH,
  GEORGE C. HELMIG.